(12) United States Patent
Loh

(10) Patent No.: US 7,725,909 B2
(45) Date of Patent: May 25, 2010

(54) APPARATUS FOR CENTERING AN INFORMATION MEDIUM ON A TURNTABLE

(75) Inventor: Kum Chung Loh, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 241 days.

(21) Appl. No.: 10/599,196

(22) PCT Filed: Mar. 21, 2005

(86) PCT No.: PCT/IB2005/050962

§ 371 (c)(1),
(2), (4) Date: Aug. 20, 2008

(87) PCT Pub. No.: WO2005/093739

PCT Pub. Date: Oct. 6, 2005

(65) Prior Publication Data

US 2008/0301726 A1    Dec. 4, 2008

(30) Foreign Application Priority Data

Mar. 26, 2004 (EP) .................................. 04300165

(51) Int. Cl.
*G11B 17/28* (2006.01)
(52) U.S. Cl. ..................................................... 720/704
(58) Field of Classification Search ........................ None
See application file for complete search history.

(56) References Cited

U.S. PATENT DOCUMENTS

| | | | |
|---|---|---|---|
| 5,774,445 A * | 6/1998 | Sawi et al. ................... 720/707 |
| 5,799,006 A | 8/1998 | Mukawa | |
| 5,862,120 A * | 1/1999 | Mukawa ..................... 720/707 |
| 5,889,757 A | 3/1999 | Mori et al. | |
| 6,041,033 A * | 3/2000 | Otsubo et al. ............... 720/707 |
| 6,249,506 B1 * | 6/2001 | Oowaki et al. .............. 720/706 |
| 6,570,836 B2 * | 5/2003 | Yabushita ................... 720/710 |
| 6,611,490 B1 * | 8/2003 | Bierhoff ..................... 720/707 |
| 6,697,320 B2 * | 2/2004 | Yeh et al. .................... 720/710 |
| 6,757,238 B2 * | 6/2004 | Higuchi ...................... 720/710 |
| 6,826,772 B2 * | 11/2004 | Kim et al. ................... 720/710 |
| 7,263,704 B2 * | 8/2007 | Fukasawa ................... 720/706 |
| 2006/0184957 A1 * | 8/2006 | Koshino ..................... 720/706 |

FOREIGN PATENT DOCUMENTS

| JP | 07065471 | 3/1995 |
|---|---|---|
| JP | 08017116 | 1/1996 |
| JP | 10275414 | 10/1998 |

* cited by examiner

*Primary Examiner*—Mark Blouin

(57) ABSTRACT

A turntable for an optical storage drive comprises a fitting member (4) consisting of a stationary yoke and a movable yoke (40) carrying a sliding cam (40a). A plurality of inwardly directed, equally spaced, resiliently deformable fingers (12) extend from a disc setting surface (3) at a location radially inward from the periphery of the turntable. In the rest position, there is no contact between the sliding cam (40a) and the fingers (12). However, after a disc (101) has been positioned on the turntable, the movable yoke is lifted and the sliding cam (40a) provides a locking effect on the fingers (12), thereby improving the centering force thereof.

9 Claims, 5 Drawing Sheets

APPARATUS FOR CENTERING AN INFORMATION MEDIUM ON A TURNTABLE

FIELD OF THE INVENTION

This invention relates to apparatus for centering an information medium on a turntable and, more particularly, to apparatus for centering a high speed optical storage medium on a turntable. The present invention also relates to a turntable including such disc centering apparatus. Examples of such information media are, for example, CD-ROM, CD-R, CD-RW, DVD, Blu Ray Disc, Portable Blu, etc. In these examples, the information medium is an optical storage medium and has the shape of a disc.

BACKGROUND OF THE INVENTION

A disc drive device conventionally comprises a turntable for receiving an optical disc and for rotating the optical disc at a predetermined rotational speed. Problems exist in relation to high-speed optical data storage systems, caused primarily by imbalance effects which occur during rotation of the optical disc. These imbalance effects are caused by various factors, and may be counteracted in prior art systems by the provision of a centering element.

A first type of disc centering mechanism for a removable disc optical storage drive is known as the "sliding cone" type, which uses a so-called "sliding cone" for disc centering purposes. In such a mechanism, a centering member or sliding cone is provided which has a magnet fixed thereto. Another magnet is provided on the clamping member. In use, after a disc has been loaded, the sliding cone is moved upwards by the attraction thereof to a magnet provided on the clamping member, such that the cone becomes wedged in a gap between the inner periphery of a disc and the fitting member. Disc centering mechanisms of this type are described for example in Japanese patent application numbers JP 07065471 A, JP 08017116 A and JP 10275414 A.

However, one main disadvantage of this type of mechanism in current DVD applications, in particular, is the so-called "flying disc" problem, whereby improper design of the sliding cone can cause the disc to "fly" off the turntable, especially during high speed, acceleration, operational shock and unbalanced disc operation, which is a very critical problem because dislocation of the disc can damage the disc and the drive permanently. In addition to external operation factors, other factors which can contribute to the above-mentioned "flying disc" problem include cone shape design, material (friction), disc type and the resultant clamping force.

Referring to FIG. 1 of the drawings, the shape design of the sliding cone 40 is restricted by the tolerance of the inner diameter of the clamping member 15, the thickness of the clamping area and the type and format of the disc 101. In the illustrated example, a dual sided DVD disc 101 is shown, which has an offset between both sides of the disc. Therefore, the slope of the cone 40 must be designed accordingly. This further increases the risk of "flying disc" in the event of even a slight axial displacement of the cone or disc (A).

The friction coefficient of the cone 40 is difficult to control as it is subject to lifetime (disc loading/unloading) and contamination from the disc clamping area. Normally, to achieve better dimension stability, stainless steel or PPS (Polyphenylene Sulphide) is used. This can also be quite costly.

The cone lifting force created by the complementary magnets reduces the resultant clamping force (equal to the initial clamping force minus cone lifting force), which in turn can lead to "flying disc". In order to increase the resultant clamping force, the clamper magnet air gap can be reduced. However, if the clamping force is too high, another problem can arise whereby disengagement of the clamping member 5 from the turntable can be difficult when there is no disc loaded in the drive. This increases the stress on the loading motor. On the other hand, reduction of the cone lifting force can cause a loss of centering performance in the case where the disc is highly unbalanced.

Another type of disc centering mechanism is disclosed in U.S. Pat. No. 5,799,006. Referring to FIG. 2 of the drawings, said U.S. patent describes a turntable 2 having a central fitting member 4 for receiving an optical disc 101. The fitting member 4, which fits over the spindle 1 of an electric motor 5, is provided with a centering ring 11 having a plurality of outwardly directed fingers 12 in the form of spring plates so as to be resiliently deformable. In use, an optical data storage disc 101 is fitted by its center aperture 102 over the centering ring 11, causing it to bear on the centering fingers 12 such that they are elastically deformed and apply pressure in a radial direction on the inner rim of the central aperture 102 of the optical data storage disc 101. The optical data storage disc 101 is provided with a magnetic plate 104 which, when the disc is loaded, is attracted by a magnet 9 mounted in the fitting member 4 so as to press the disc 101 against a disc setting surface 3.

The problem of "flying disc" does not tend to occur in the case of finger centering type mechanisms such as that described in U.S. Pat. No. 5,799,006 for two reasons. Firstly, referring to FIG. 3 of the drawings, the angle or slope of the finger(s) 12 at the disc-finger contact point B can be made much steeper compared with the sliding cone mechanism illustrated in FIG. 1 of the drawings, bearing in mind that the fingers 12 are flexible in the radial direction C. This helps to prevent the disc 101 from slipping off the turntable. In addition, in the case of any displacement of the disc 101 in the radial direction, the inner diameter 102 of the disc 101 will be stopped first on the turntable vertical wall 50, thereby preventing it from "flying" off.

However, with a disc centering arrangement such as that described in U.S. Pat. No. 5,799,006, the centering performance tends to deteriorate as rotation speeds increase due to an increase in centrifugal force caused thereby, particularly in the case of highly imbalanced discs. The increased centrifugal force overcomes the centering finger force that results in undesirably high disc eccentricity. In order to solve this problem, it has been proposed to increase the force exerted on the inner rim of the central aperture of the optical data storage disc (by strengthening the fingers). However, this causes its own problem during the disc loading operation in which, in order to achieve proper disc positioning on the turntable, a very high clamping force is required to overcome the higher finger force during disc loading. This requirement is, however, difficult to meet using current loading mechanisms and clamper designs.

SUMMARY OF THE INVENTION

It is therefore an object of the present invention to provide a disc centering apparatus. for a turntable, in which centering performance at high speeds is improved, without the above-mentioned disadvantages associated with known solutions.

Thus, in accordance with the present invention, there is provided apparatus for centering an information medium on a turntable, the apparatus comprising a fitting member for receiving the information medium via a substantially central aperture thereof, one or more resiliently deformable members located adjacent the inner rim of said substantially central aperture, when an information medium is loaded on said turntable, and a movable locking member cooperatively arranged relative to said one or more resiliently deformable members, said movable locking member being arranged and configured to move, in use, between a first position in which it exerts little or no pressure on said one or more resiliently deformable members, and a second position in which a generally radial force is exerted thereby on said one or more resiliently deformable members such that said one or more resiliently deformable members exert a corresponding centering force on said inner rim of said substantially central aperture of said information medium.

The present invention also extends to a turntable for a data storage drive, the turntable including such information medium centering apparatus and comprising a motor having a spindle which is communicably coupled with the fitting member of the above-mentioned apparatus, and further to a data storage drive including such a turntable.

According to an embodiment of the invention, the fitting member may comprise a stationary portion, for example, a substantially annular yoke, at least a portion of which is beneficially formed of a ferrous metal. The movable locking member is preferably provided on a movable yoke, at least a portion of which is formed of a ferrous metal, a sliding cam being formed thereon, or integrally therewith, which sliding cam is cooperatively arranged relative to the one or more resiliently deformable members. The movable locking member is preferably arranged to move in a generally vertical direction relative to the plane of an information medium, when in use.

The turntable beneficially comprises a disc setting surface for receiving an information medium, the disc setting surface preferably having a peripheral friction sheet thereon. The one or more resiliently deformable members beneficially extend upwardly from a lip portion located radially inwardly from the circumference of the disc setting surface. The turntable beneficially comprises a clamping member including at least a portion, such as an annular circumferential edge, which presses down on an information medium, when in use, such that it abuts the friction sheet on the disc setting surface. The clamping member beneficially includes at least one magnet means for attracting a corresponding ferrous portion of said movable locking member, thereby to cause movement thereof, in use. The fitting member may also include magnetic means for attracting the clamping member and therefore increasing the pressure exerted thereby on the information medium, when in use.

These and other aspects of the present invention will be apparent from, and elucidated with reference to, the embodiment described herein.

BRIEF DESCRIPTION OF THE DRAWINGS

An embodiment of the present invention will now be described by way of example only and with reference to the accompanying drawings, in which.

DETAILED DESCRIPTION OF THE INVENTION

As explained above, in prior art arrangements, turntable centering fingers are used to improve the centering position of an optical disc during loading and normal operation. In one specific exemplary embodiment of the prior art, five fingers at substantially equal distances apart are used in the design. Good disc centering position provides lower eccentricity, which in turn improves power dissipation and radial actuator error at motor rotational frequency. If the disc is highly unbalanced, during high rotational speed operation, the increased centrifugal force created by the disc will overcome the centering finger(s) force, which results in an undesirably high disc eccentricity.

It is therefore an object of the present invention to provide an improved disc centering mechanism which overcomes all of the above-mentioned problems, associated with both the finger centering and the sliding cone type disc centering mechanisms.

Figure 4:
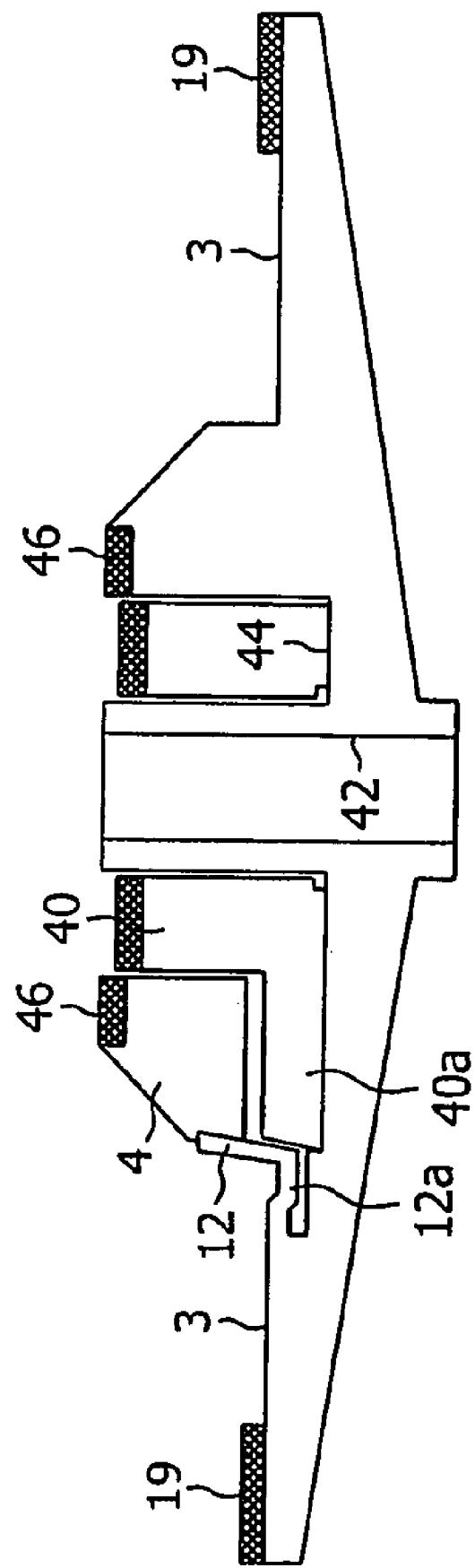
FIG. 4 is a schematic cross-sectional view of a turntable according to an exemplary embodiment of the present invention, when at rest.

Referring to FIG. 4 of the drawings, a turntable according to an exemplary embodiment of the present invention comprises a substantially circular disc setting surface 3 on which an annular, circumferential friction mat or sheet 19 is provided. The spindle of an electric motor (not shown) is received in a generally central bore 42. The turntable further comprises a stationary fitting member 4 in the form of a stationary metal yoke, having an annular groove 44 within which is provided a movable metal yoke 40.

Figure 1:
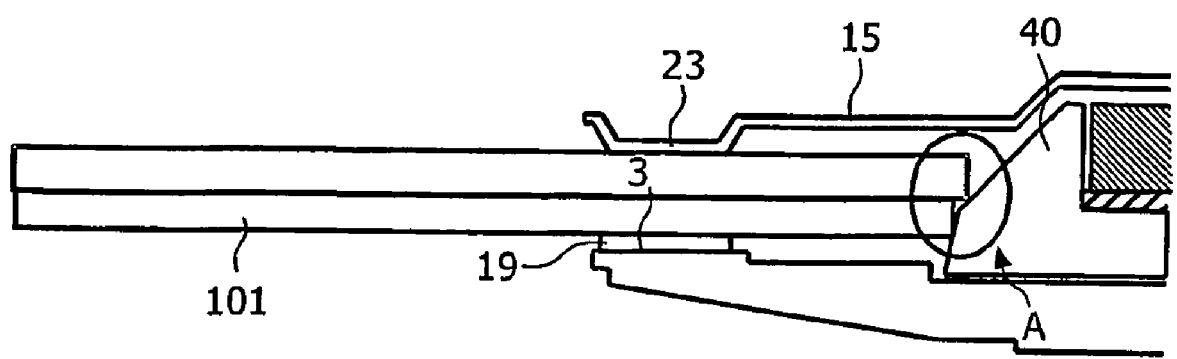
FIG. 1 is a partial cross-sectional view of a turntable according to the prior art, illustrating the concept of sliding cone centering.
Figure 2:
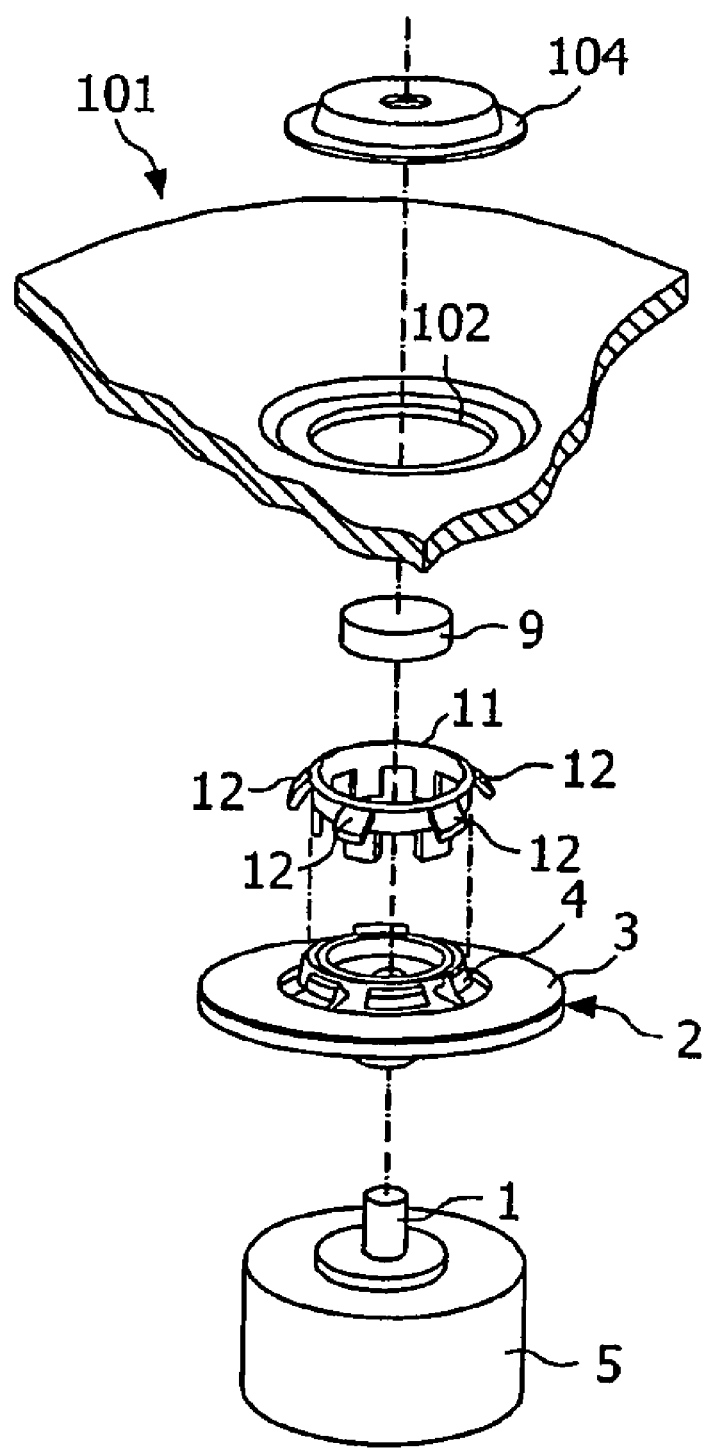
FIG. 2 is an exploded perspective view of a turntable according to the prior art, illustrating the concept of disc centering using fingers.

A plurality of (for example five) inwardly directed, equally spaced, resiliently deformable fingers 12 extend from the disc setting surface 3 at a location radially inward from the periphery of the turntable. It will be appreciated that the finger 12 of the arrangement illustrated in FIG. 4 extends upwards and outwards from a lip 12a extending radially inward from the disc setting surface 3, as opposed to extending outward and down from a centering ring as in the arrangement of FIG. 2, such that when an optical disc 101 is initially placed over the fitting member 4, little pressure is exerted on the inner rim 102 of the disc 101. The upper surface of the stationary yoke 4 is provided with a ring magnet 46. Extending radially outward from the movable yoke 40, there is provided a sliding cam 40a.

Figure 5:
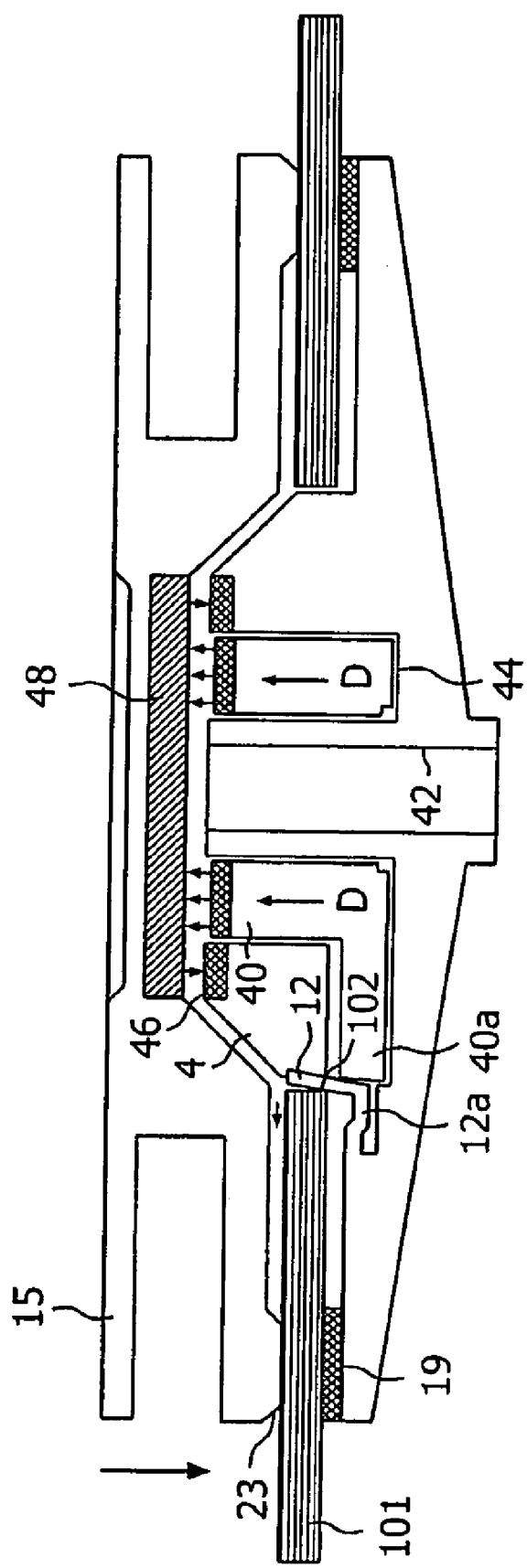
FIG. 5 is a schematic cross-sectional view of a turntable according to an exemplary embodiment of the present invention, in the disc-loaded condition.

Referring additionally to FIG. 5 of the drawings, the turntable further comprises a clamping member 15 which has an annular circumferential edge 23 for pressing downwards on the disc 101 so as to cause it to abut a friction mat 19 on the disc setting surface 3 and achieve the desired disc position on the turntable. The clamping member 15 defines an inner recess for receiving the fitting member 4, when a disc 101 is loaded on the turntable, an upper wall of which recess is provided with a ring magnet 48, such as a Neodymium Iron Boron NdFeB magnet or the like.

In the rest position illustrated by FIG. 4, there is no contact between the sliding cam 40a and the finger(s) 12, thereby allowing an optical data storage disc to be positioned on the turntable friction ring 19 while the finger force is minimal. During loading of a disc media onto the turntable, after a disc 101 has been positioned on the turntable friction ring 19, the clamping member 15 is lowered and attracted towards the turntable by the stationary yoke 4 at the outer circumference of the fitting member 4, following which the motor turntable and the disc 101 will be lifted up towards the clamping member 15, such that the disc 101 rests in the preferred centre position. As the air gap between the magnet 48 on the clamping member 15 and the movable yoke 40 decreases, the movable yoke will be lifted in the direction denoted by D, i.e. the sliding cam 40a is attracted toward the damper magnet 48. The sliding cam 40a provides a locking effect on the fingers 12, thereby improving the centering force thereof.

During unloading of the disc 101 from the turntable, the clamping airgap is once again increased, such that the attractive force between the clamping magnet 48 and the movable yoke 40 is reduced and the sliding cam 40a falls back into the rest position. It will be appreciated that, due to the resultant reduction in finger centering force, the disc 101 can be relatively easily removed from the centering fingers 12 when the sliding cam 40a is not engaged.

Figure 3:
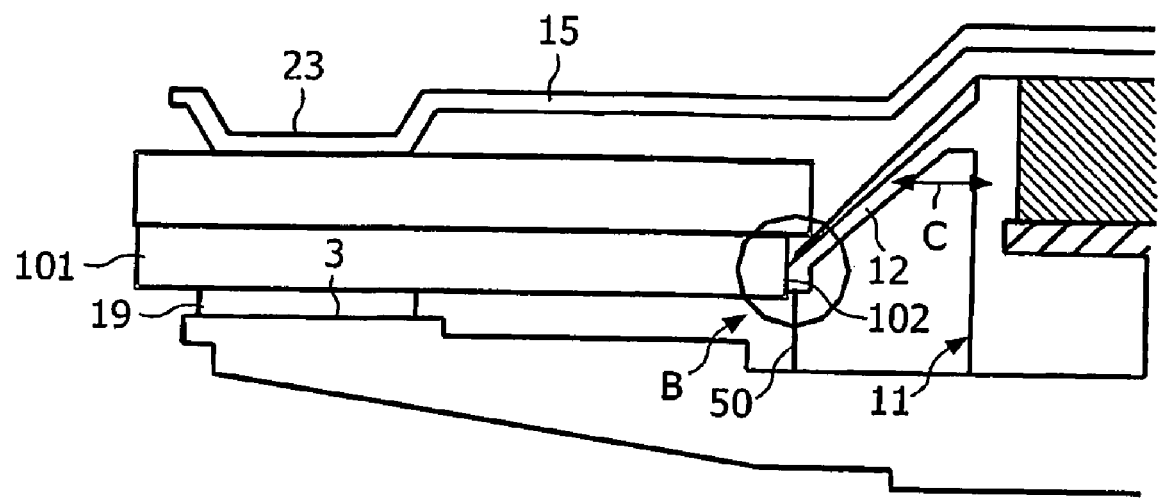
FIG. 3 is a partial cross-sectional view of a turntable according to the prior art, illustrating the concept of disc centering using fingers.

Thus, in the arrangement of the present invention, disc centering is performed using resiliently deformable fingers, which in the above-described exemplary embodiment extend upward from a lower lip. As a result, "flying disc" does not occur because of the steep angle at the finger-disc contact point (similar to the concept described with reference to FIG. 3). However, a good disc centering position can be maintained, even at high speeds, using the arrangement of the present invention, due to the provision and operation of the sliding cam (derived from the "sliding cone"). Furthermore, because there is no direct contact between the disc and the sliding cam 40a, design constraints on the sliding cam shape are greatly reduced. A very steep slope on the cam can be considered to achieve a much higher locking force, if required. In other words, the present invention therefore combines the principal advantages of both the sliding cone and finger centering designs. In addition, unlike the conventional sliding cone turntable centering designs, the arrangement of the present invention does not require a spring under the cone, which can provide a cost saving.

It will be apparent to a person skilled in the art that the present invention is applicable to any high-speed optical data storage application (e.g. CD/DVD/Blu-ray) in which a disc centering facility is required.

An embodiment of the present invention have been described above by way of example only, and it will be apparent to a person skilled in the art that modifications and variations can be made to the described embodiment without departing from the scope of the invention as defined by the appended claims. Further, in the claims, any reference signs placed between parentheses shall not be construed as limiting the claim. The term "comprising" does not exclude the presence of elements or steps other than those listed in a claim. The terms "a" or "an" does not exclude a plurality. The invention can be implemented by means of hardware comprising several distinct elements. In a device claim enumerating several means, several of these means can be embodied by one and the same item of hardware. The mere fact that measures are recited in mutually different independent claims does not indicate that a combination of these measures cannot be used to advantage.

The invention claimed is:

1. Apparatus for centering an information medium (101) on a turntable, the apparatus comprising:
   a disc setting surface (3) for receiving the information medium (101) having a peripheral friction sheet (19) thereon;
   a stationary fitting member (4) in the form of a stationary metal yoke, for receiving the information medium (101) via a substantially central aperture (102) thereof, the stationary fitting member (4) including a ring magnet (46) on an upper surface and an angular groove (44) within which is provided a movable metal yoke (40) and;
   a plurality of inwardly directed and equally spaced, resiliently deformable members (12) extending from the disc setting surface (3) at a location adjacent the inner rim of said substantially central aperture (102) of said information medium, when the information medium (101) is loaded on said turntable; and
   a movable locking member (40) provided on the movable metal yoke at least a portion of which is formed of a ferrous material, the movable locking member (40) being cooperatively arranged relative to said plurality of resiliently deformable members (12);
   the movable locking member (40) including a sliding cam (40a), formed thereon, or integrally therewith, and is cooperatively arranged relative to the one or more resiliently deformable members (12),
   wherein said movable locking member (40) is arranged and configured to move, in a generally vertical direction, between a first position in which it exerts little or no pressure on said one or more resiliently deformable members (12) and a second position in which a generally radial force is exerted thereby on said one or more resiliently deformable members (12) such that said one or more resiliently deformable members (12) exert a corresponding centering force on said inner rim of said substantially central aperture (102) of said information medium (101), and
   a clamping member (15) having an annular circumferential edge (23) for pressing down on the information medium (101) to cause the information medium (101) to abut the peripheral friction sheet (19) on the disc setting surface (3), the clamping member (15) defining an inner recess for receiving the fitting member (4), when the information medium (101) is loaded on the turntable, an upper wall of which inner recess is provided with a magnetic means (48) for attracting the ferrous portion of the movable locking member (40) causing said movable locking member (40) to move from said first position to said second position.

2. A turntable for a data storage drive, the turntable including information medium centering apparatus according to claim 1, and further comprising a motor having a spindle which is communicably coupled with said fitting member (4).

3. A turntable according to claim 2, comprising a disc setting surface (3) for receiving an information medium (10).

4. A turntable according to claim 3, wherein the disc setting surface (3) has peripheral friction sheet (19) thereon.

5. A turntable according to claim 3, wherein the one or more resiliently deformable members (12) extend upwardly from a lip portion (12a) located radially inwardly from the circumference of the disc setting surface.

6. A turntable according to claim 2, further comprising means (23) for pressing down on an information medium (101) when in use.

7. A turntable according to claim 6, wherein the clamping member (15) includes at least one magnet means (48) for attracting a corresponding ferrous portion of said movable locking member (40), thereby to cause movement thereof, in use.

8. A turntable according to claim 6, wherein said fitting member (4) includes magnetic means for attracting the clamping member (15) and therefore increasing the pressure exerted thereby on the information medium (101) when in use.

9. A data storage drive including a turntable according to claim 1.

\* \* \* \* \*